United States Patent [19]
Lawther et al.

[11] Patent Number: 5,835,810
[45] Date of Patent: Nov. 10, 1998

[54] AUTOMATED CAMERA LOADING CHAMBER

[75] Inventors: Joel Sherwood Lawther; Robert James Stanchus, both of Rochester, N.Y.

[73] Assignee: Eastman Kodak Company, Rochester, N.Y.

[21] Appl. No.: 687,879

[22] Filed: Jul. 25, 1996

Related U.S. Application Data

[63] Continuation of Ser. No. 316,018, Sep. 30, 1994, abandoned.

[51] Int. Cl.⁶ ..................................................... G03B 17/02
[52] U.S. Cl. ............................................................ 396/538
[58] Field of Search ...................................... 396/538, 511, 396/512

[56] References Cited

U.S. PATENT DOCUMENTS

| | | | |
|---|---|---|---|
| 5,477,295 | 12/1995 | Lawther et al. | 396/538 |
| 5,483,314 | 1/1996 | Lawther et al. | 396/538 |
| 5,608,475 | 3/1997 | Inoue | 396/319 |

FOREIGN PATENT DOCUMENTS

7295076-A  4/1994  Japan ............................. G03B 17/30

*Primary Examiner*—David M. Gray
*Attorney, Agent, or Firm*—Charles E. Snee, III

[57] ABSTRACT

Apparatus for automatically moving a film cartridge completely into a cartridge loading chamber includes means for automatically sensing that the cartridge has been partially inserted into the chamber and means for automatically moving the film cartridge fully into the cartridge chamber upon the sensing means sensing that the cartridge has been partially inserted into the chamber.

13 Claims, 9 Drawing Sheets

AUTOMATED CAMERA LOADING CHAMBER

CROSS-REFERENCE TO RELATED APPLICATION

This is a continuation of Ser. No. 08/316,018 filed Sep. 30, 1994 and now abandoned. Reference is made to commonly assigned application Ser. No. 08/205,001, entitled Film Cartridge Loading Apparatus For Camera and filed Mar. 1, 1994 in the names of Lawther et al, now U.S. Pat. No. 5,483,314.

FIELD OF THE INVENTION

The invention relates generally to the field of photography, and in particular to cameras. More specifically, the invention relates to an automated camera loading chamber.

BACKGROUND OF THE INVENTION

U.S. Pat. No. 5,159,365 discloses, in FIGS. 13–15, a camera having a magazine chamber 201A into which a magazine 202 can be inserted axially. A rear cover 203 is manually movable to cover and uncover the chamber. The magazine is contained in the chamber by a holder including an axially movable member 204 and a rotatable engaging member 205 at an end of member 204. In order to fully insert a magazine into the chamber, a camera operator must both (a) manually, partially insert the magazine into the chamber such that it engages member 204 and (b) manually rotate engaging member 205 counter-clockwise such that an end hook portion 205B engages with the rim of the magazine and switch Sw2 is opened. Opening switch Sw2 causes a motor to be operated which turns a feed screw 207. Interaction of feed screw 207 with a projection 204A causes member 204 and the magazine to be moved completely into the chamber.

A problem with the structure described in the previous paragraph is that a camera operator must manually accomplish two steps in order to cause the magazine to be fully inserted into the chamber. That is, the operator must both (a) manually, partially insert the magazine into the chamber and (b) manually rotate engaging member 205 counter-clockwise. Requiring an operator to accomplish two steps to load a film magazine into the chamber decreases the user friendliness of such a camera and increases the time it takes to load the magazine fully into the chamber.

A further problem with the aforedescribed structure is that after the magazine has been fully loaded in the chamber, the operator must manually close the rear cover of the camera. This is an additional, manual step which further decreases the user friendliness of the camera and increases the time it takes to prepare the camera for picture taking.

SUMMARY OF THE INVENTION

The present invention is directed to overcoming one or more of the problems set forth above. Briefly summarized, according to one aspect of the present invention, apparatus for automatically moving a film cartridge completely into a cartridge loading chamber includes means for automatically sensing that the cartridge has been partially inserted into the chamber and means for automatically moving the film cartridge fully into the cartridge chamber upon the sensing means sensing that the cartridge has been partially inserted into the chamber.

By automatically sensing that the film cartridge has been partially inserted into the chamber, the cartridge can be automatically moved fully into the cartridge chamber without the operator having to manually perform another step, such as closing a switch. As such, the camera is more user friendly and allows quicker loading of a film cartridge into the camera.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

The invention is disclosed as being embodied preferably in a still-picture camera employing a film cartridge, e.g. a 35 mm film cartridge. Because the features of this type of camera are generally well known, the description which follows is directed in particular to camera elements forming part of or cooperating directly with the preferred embodiment. It is to be understood, however, that other elements not shown or described may take various forms known to one of ordinary skill in the art.

Figure 1:
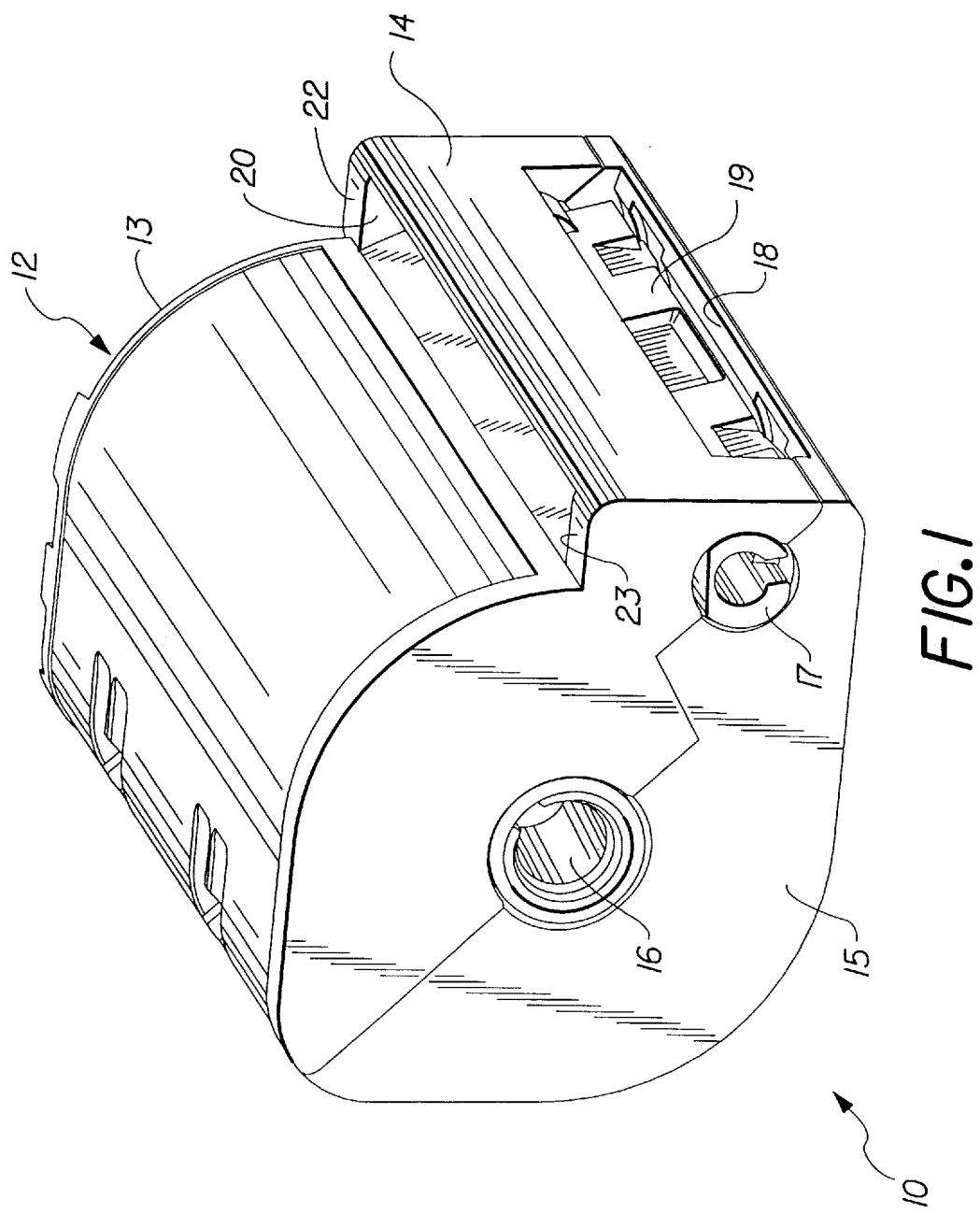
FIG. 1 is a perspective view of a film cartridge usable with a camera incorporating the present invention.
Figure 5:
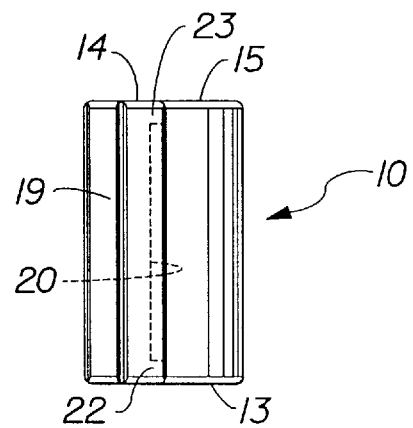
FIG. 5 is a sectional views of FIG. 2 taken along lines 5—5.
Figure 5:
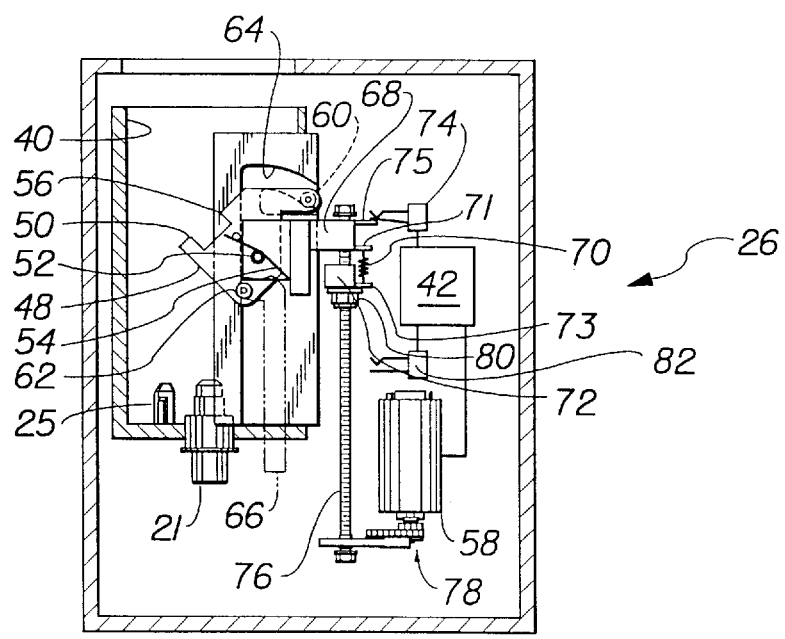

Referring now to the drawings and first to FIG. 1, it depicts in perspective view a thrust type film cartridge 10 containing a filmstrip wound on a spool (both within an axially elongated opaque plastic or metal cartridge shell 12) attached to a core or hub 16 in a manner similar to the film cartridge or cassette disclosed in U.S. Pat. No. 5,049,914. The filmstrip may be thrust out of the cartridge shell 12 by application of rotary motion via a spindle 21 (see FIG. 5) to the cartridge spool 16 to thrust its leading end through the light trapping opening in cartridge snout 14. A retention slot 20 is formed in the inner surface of cartridge snout 14 extending longitudinally between portions 22 and 23 of respective ends of snout 14 and shell 12. The shell 12 has a first, leading end 13 and a second non-drive end 15.

The door drive interface 17 is intended to be engaged by a door opening driver 25 (shown in FIG. 5) of the camera that extends into the loading chamber of the camera body to effect the opening of a cartridge door 19 over the opening 18 when the filmstrip is to be thrust out of or has been re-wound back into the cartridge 10.

Figure 2:
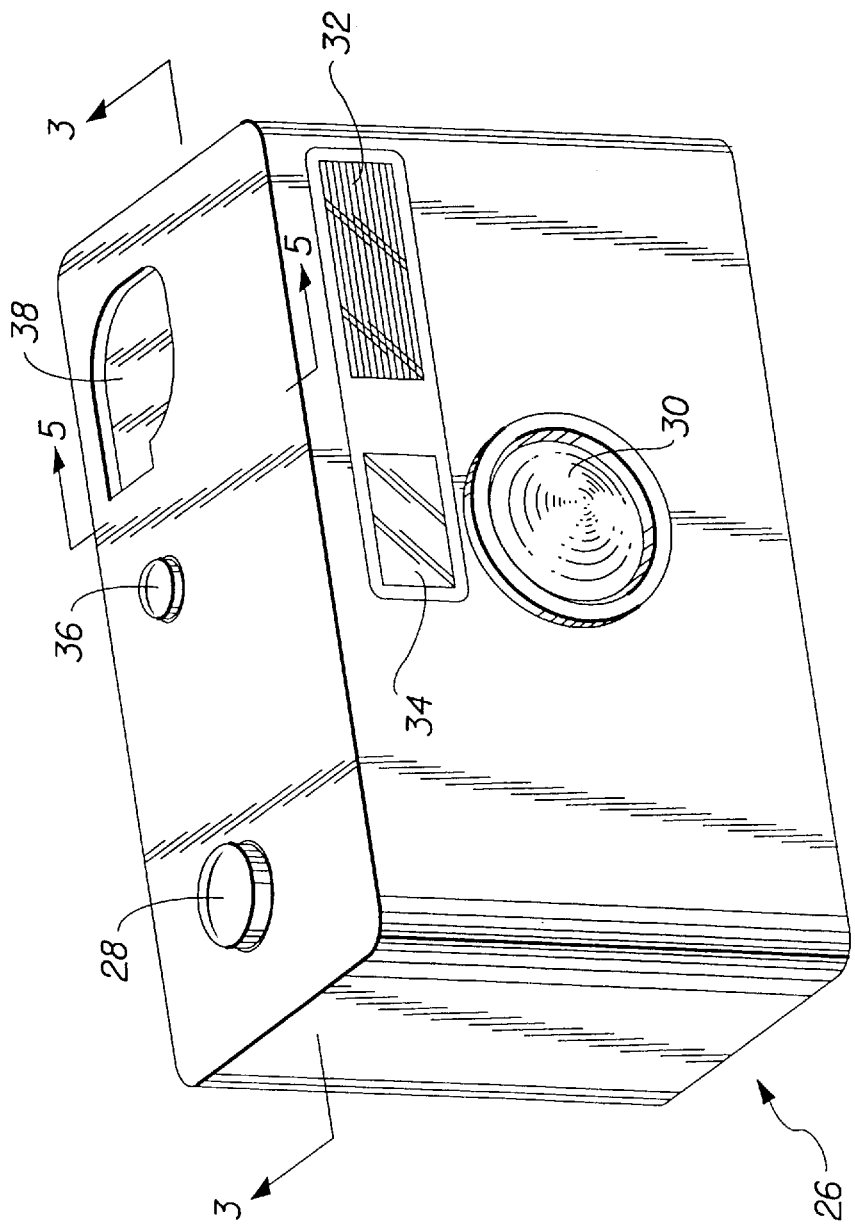
FIG. 2 is a schematic perspective view of a camera incorporating the present invention.

Turning now to FIG. 2, a camera 26 is shown which utilizes cartridge 10 described above. Camera 26 includes a shutter button 28 for actuating a picture taking sequence, an objective lens system 30 and a flash 32 for artificially illuminating a scene to be photographed. Ambient light reflected from the scene passes through a window 34 and is used by the camera to determine scene characteristics such as scene brightness and camera-to-scene distance. A button 36 is used to control the opening and closing of a film cartridge chamber door 38 as well as the loading and ejection of a film cartridge into and out of the cartridge chamber. An electric power supply (not shown), well known to those skilled in the art, includes one or more batteries and is used to operate various components of the camera.

Figure 3:
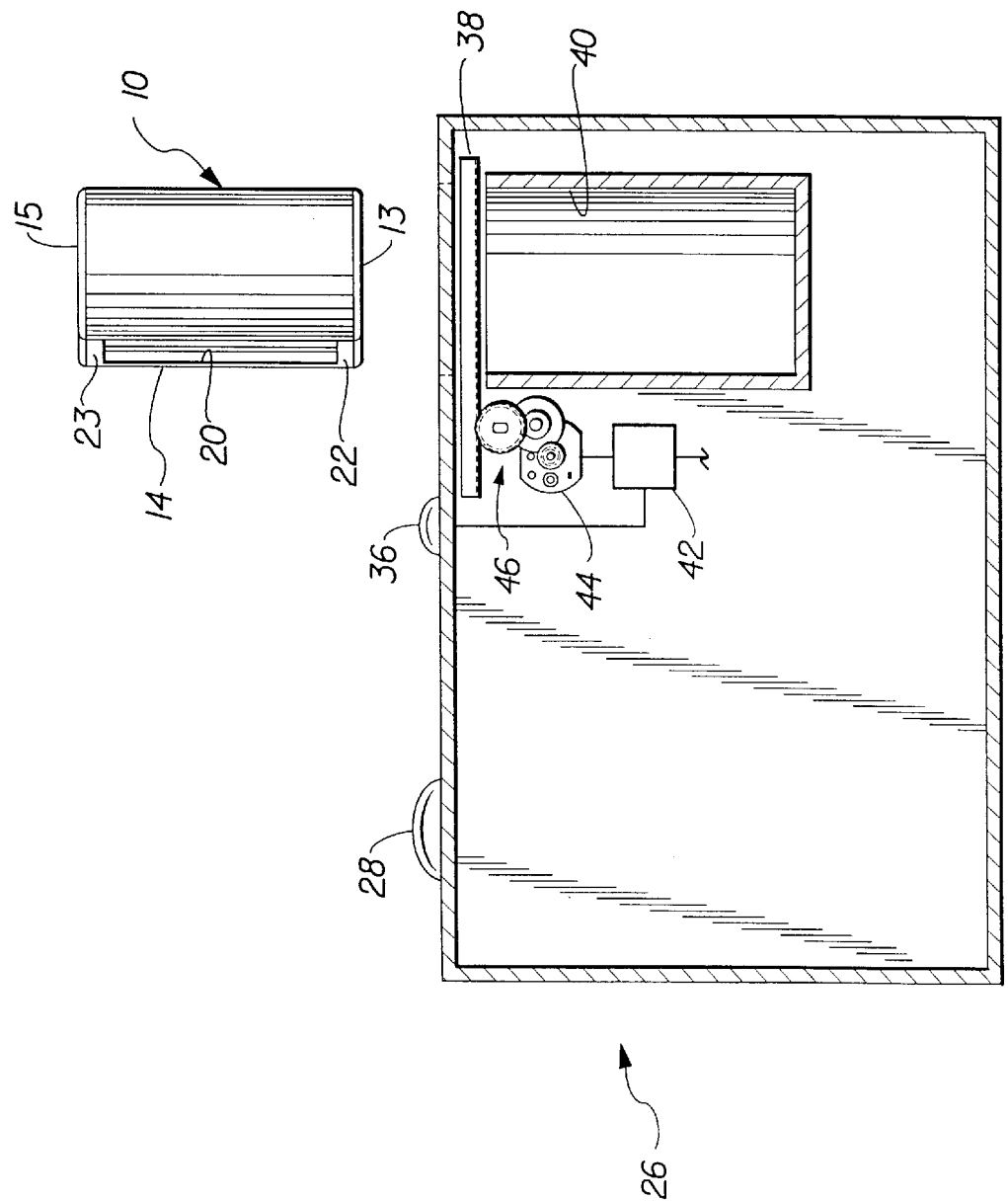
FIG. 3 is a sectional view of FIG. 2 taken along lines 3—3.
Figure 4:
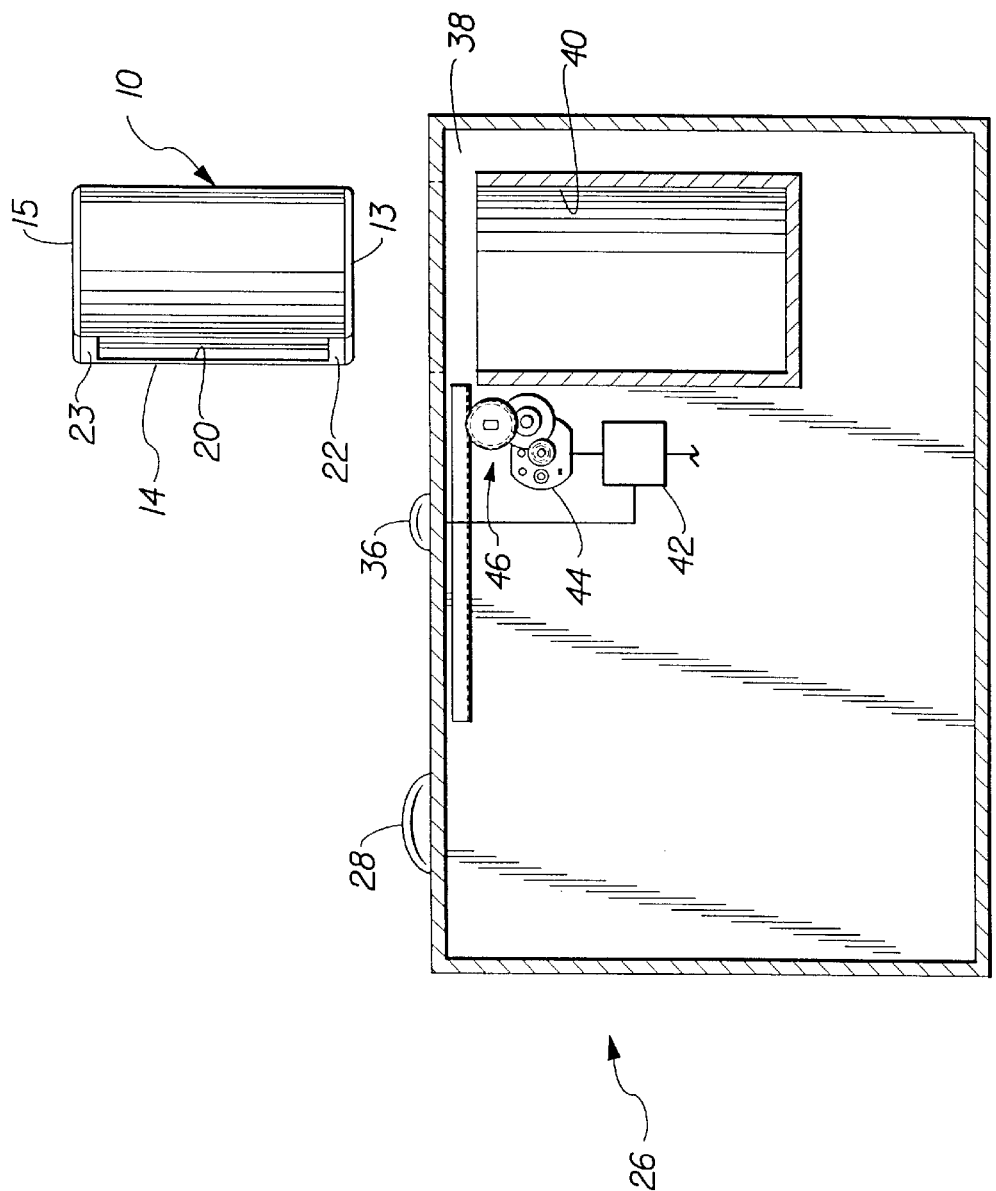
FIG. 4 is similar to FIG. 3 except that door 38 is in an open position.

Referring to FIGS. 3 and 4, when a camera operator desires to load cartridge 10 into an elongated cartridge loading chamber 40 of camera 26, the operator pushes button 36. Button 36 is connected to a microprocessor 42 which controls the operation of camera 26. Microprocessor 42 then checks the state of a cartridge presence switch (described below) to determine if a film cartridge is present in chamber 40. Assuming a film cartridge is not present in chamber 40, microprocessor 42 causes an electric motor 44 to be operated which, through gearing 46 and a rack on door 38, causes door 38 to be moved to the left to an open position, thereby opening chamber 40 (see FIG. 4).

Figure 6:
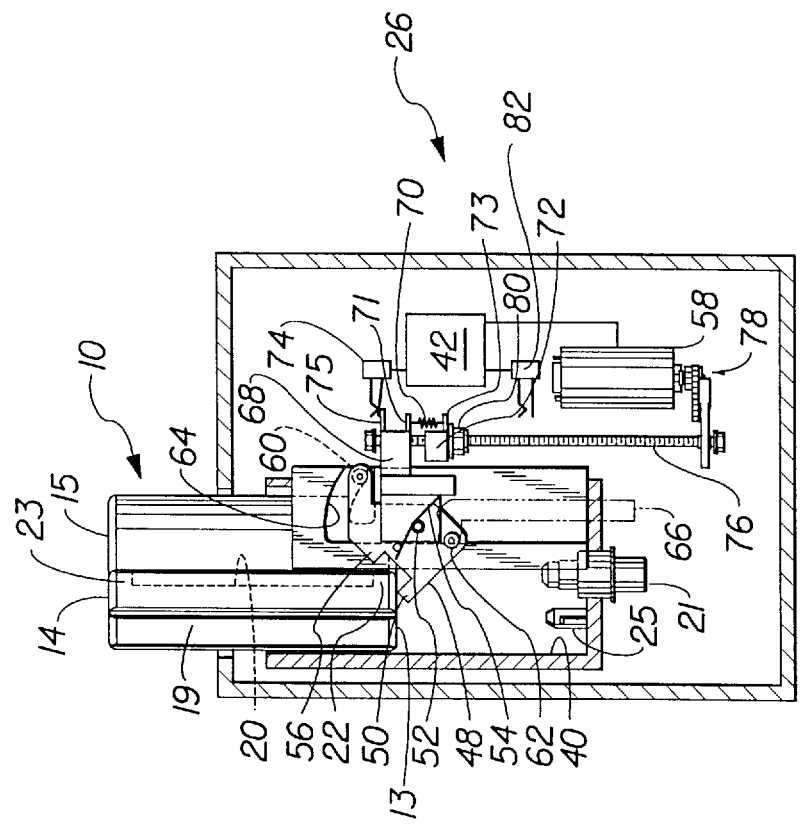
FIGS. 6–8 are similar to FIG. 5 and show a film cartridge at various points of being inserted into a cartridge chamber.

Turning now to FIGS. 5–8, once door 38 has been moved to an open position, the camera operator manually inserts cartridge 10 axially partially into chamber 40 (FIG. 6). As cartridge 10 is inserted into chamber 40, portion 22 of cartridge 10 contacts a C-clamp 48 at a lower tab portion 50. C-clamp 48 is movably mounted to rotate about a pivot-pin 52 and is biased in a clockwise direction by a torsion spring 54. As cartridge 10 is pushed by the operator against C-clamp 48, the C-clamp rotates in a counter-clockwise direction about pivot pin 52. A pair of guide posts 60, 62 ride respectively in a pair of guide slots 64, 66 to guide the rotation and translation of the C-clamp.

Figure 7:
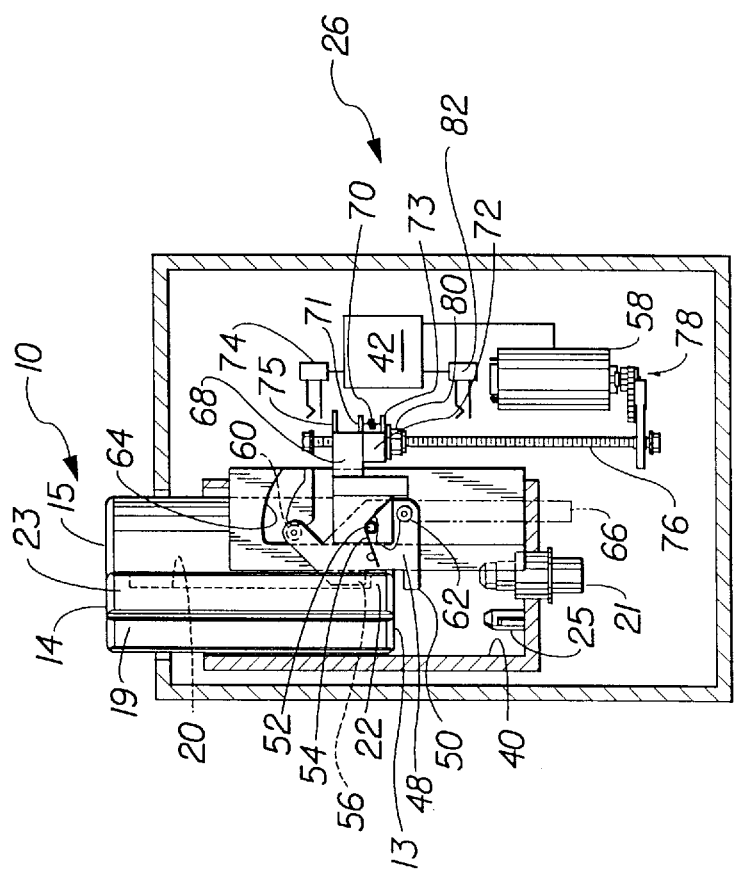
Figure 8:
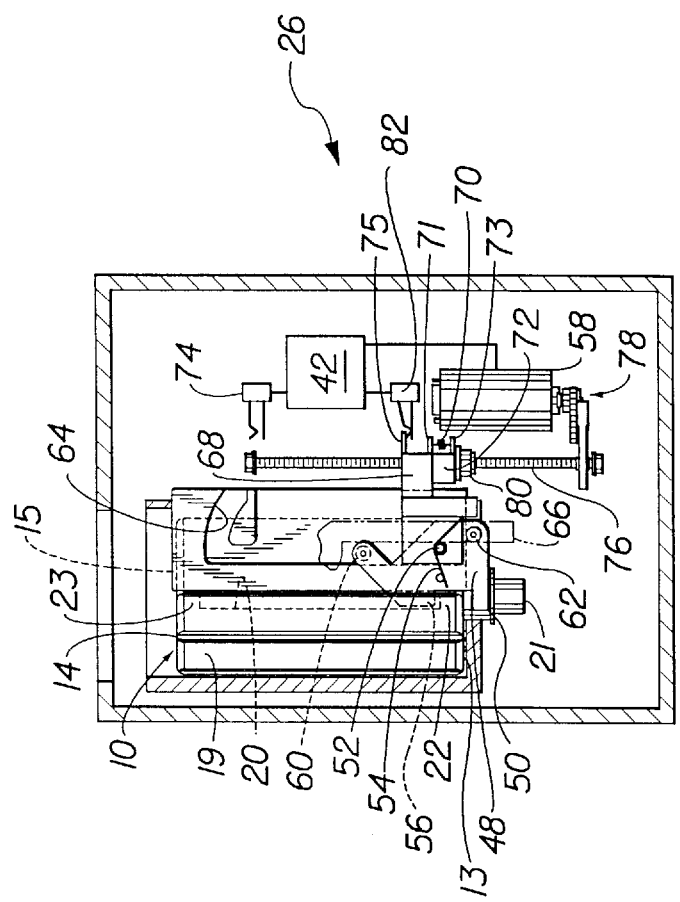

As C-clamp 48 is rotated, the force of cartridge 10 against torsion spring 54 causes the C-clamp to be further rotated in a counter clockwise direction towards a position shown in FIG. 7. An upper tab portion 56 of C-clamp 48 engages into retention slot 20 of cartridge 10 as the C-clamp rotates to clamping engagement with cartridge 10, as shown in FIG. 7, further drawing cartridge 10 into chamber 40 to a partial insertion position. As such, portion 22 of cartridge 10 is trapped between lower tab 50 and upper tab 56. The posts and slots prevent movement of support member 68 to a full insertion position until C-clamp 48 has moved into clamping engagement with cartridge 10. The arrangement of posts 60, 62 and slots 64, 66 allows a support member 68, which supports pivot pin 52, to move alongside the elongated loading chamber between positions of partial and full insertion of cartridge 10. Support member 68 then can be lowered under the influence of a tension spring 70 from the support member's position in FIG. 6 to its partial insertion position in FIG. 7. Translation of support member 68 is halted when the support member engages a stop member 72 which is secured to a threaded nut 80. Spring 70 is attached at its ends to spring posts 71, 73 respectively secured to support member 68 and stop member 72.

Such movement of support member 68 also causes a switch post 75, secured to support member 68, to move away from a switch 74 thereby causing the switch to change from a closed state (FIG. 6) to an open state (FIG. 7) and sensing that the support member has moved toward the stop member. Microprocessor 42, recognizing and responding to this change of state in switch 74, causes an electric motor 58 to be operated. Operation of motor 58 causes rotation of a threaded post 76 via gears 78. Threaded post 76 engages threaded nut 80. Interaction of the rotating threaded post 76 with threaded nut 80 causes nut 80 to be driven in a downward direction. Consequently, stop member 72, support member 68, C-clamp 48 and cartridge 10 are driven further into chamber 40.

Figure 9:
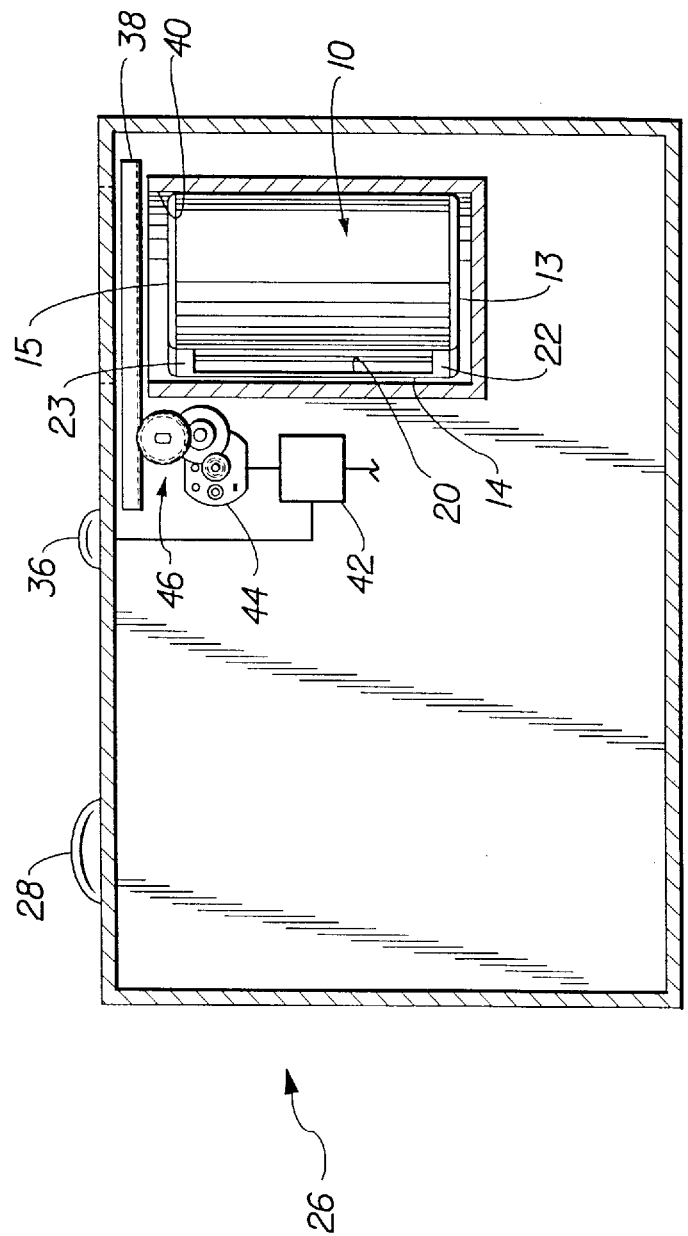
FIG. 9 is similar to FIG. 3 except that the film cartridge is fully loaded in the cartridge chamber.

Movement of the cartridge to its full insertion position in chamber 40 causes a cartridge presence switch 82 to be closed by switch post 75, thereby sensing that the support member has moved to the full insertion position and thus informing microprocessor 42 that the cartridge is fully seated in the chamber. Microprocessor 42 thereby discontinues operation of motor 58 and then causes motor 44 to be operated to close door 38 over chamber 40 (FIG. 9). Camera 26 now has a film cartridge loaded and preparations for picture taking can now begin.

After images have been recorded on all frames of the film in cartridge 10, microprocessor 10 causes the film to be wound back into cartridge 10. Alternatively, if the camera operator desires to wind the film back into cartridge 10 prior to recording images on all frames of the film, the operator presses button 36 to actuate a "mid-roll rewind" function of the camera. The microprocessor then causes motor 44 to be operated to move door 38 to an open position after which motor 58 is operated to raise C-clamp 48, thus cartridge 10, part way out of chamber 40. When switch 74 is closed by switch post 75, microprocessor 42 shuts off motor 58. The C-clamp continues to retain the cartridge and prevents the cartridge from falling out of chamber 40. A camera operator then grasps end 15 of cartridge 10 and pulls the cartridge out of the chamber. Pulling the cartridge causes C-clamp 48 to pivot clockwise about pivot pin 52. As the C-clamp pivots, torsion spring 54 causes the C-clamp to move to its position shown in FIG. 5. The C-clamp is now in position to receive another film cartridge.

If the camera operator desires to immediately load another film cartridge into chamber 40, the above-described process is repeated. If the operator does not wish to immediately load another film cartridge into chamber 40, the operator pushes button 36. Microprocessor 36, knowing there is no cartridge in the chamber because switch 82 is open, causes door 38 to be moved to a closed position. C-clamp 48 remains in its position of FIG. 5, ready to receive another cartridge.

The invention has been described with reference to a preferred embodiment. However, it will be appreciated that variations and modifications can be effected by a person of ordinary skill in the art without departing from the scope of the invention.

| PARTS LIST | |
|---|---|
| 10 | film cartridge |
| 12 | cartridge shell |
| 13 | leading drive end |
| 14 | cartridge snout |
| 15 | non-drive end |
| 16 | cartridge spool |
| 17 | door drive interface |
| 18 | door opening |
| 19 | cartridge door |
| 20 | retention slot |
| 21 | spindle |
| 22 | portion of cartridge snout 14 at end 13 |
| 23 | portion of cartridge snout 14 at end 15 |
| 25 | door opening driver |
| 26 | camera |
| 28 | shutter button |
| 30 | objective lens system |
| 32 | flash |
| 34 | window |

-continued

PARTS LIST

| | |
|---|---|
| 36 | button |
| 38 | chamber door |
| 40 | loading chamber |
| 42 | microprocessor |
| 44 | electric motor |
| 46 | gearing |
| 48 | C-clamp |
| 50 | lower tab portion |
| 52 | pivot pin |
| 54 | torsion spring |
| 56 | upper tab portion |
| 58 | electric motor |
| 60, 62 | Guide posts |
| 64, 66 | slots |
| 68 | support member |
| 70 | tension spring |
| 72 | stop member |
| 71, 73 | spring posts |
| 74 | switch |
| 75 | switch post |
| 76 | threaded post |
| 78 | gears |
| 80 | threaded nut |
| 82 | switch |

We claim:

1. Apparatus for loading an elongated photographic film cartridge axially into an elongated cartridge loading chamber, said apparatus comprising:

a support member mounted for movement alongside the elongated loading chamber between positions of partial and full insertion of the cartridge;

a clamp movably mounted to said support member and adapted to be engaged and moved by the cartridge as the cartridge is inserted into the loading chamber and to move into clamping engagement with the cartridge as the cartridge is inserted to said partial insertion position;

a stop member positioned to engage and stop movement of said support member;

means for moving said support member into engagement with said stop member when said clamp has moved into said clamping engagement;

first means for sensing that said support member has moved toward said stop member; and means, responsive to said first means for sensing, for driving said stop member and said support member engaged therewith, between said partial and full insertion positions.

2. Apparatus according to claim 1, wherein said first means for sensing comprises a switch actuated by movement of said support member.

3. Apparatus according to claim 1, wherein said means for driving comprises a lead screw operatively connected to said stop member and a motor for rotating said lead screw.

4. Apparatus according to claim 1, further comprising a guide slot engaged by said clamp for preventing movement of said support member toward said full insertion position until said clamp has engaged the cartridge.

5. Apparatus according to claim 1, wherein said means for moving comprises a tension spring between said support member and said stop member.

6. Apparatus according to claim 1, further comprising:

second means for sensing that said support member has moved to said full insertion position;

a door for closing an opening into the elongated chamber through which the cartridge may be inserted; and means, responsive to said second means for sensing, for closing said door when said support member reaches said full insertion position.

7. Apparatus according to claim 6, wherein said second means for sensing comprises a second switch actuated by movement of said support member.

8. Apparatus for loading an elongated photographic film cartridge axially into an elongated cartridge loading chamber, said apparatus comprising:

a support member mounted for movement alongside the elongated loading chamber between positions of partial and full insertion of the cartridge;

a stop member positioned to engage and stop movement of said support member;

a clamp movably mounted to said support member and adapted to be engaged and moved by the cartridge as the cartridge is inserted into the loading chamber and to move into clamping engagement with the cartridge as the cartridge is inserted to said partial insertion position;

means for preventing movement of said support member toward said full insertion position until said clamp has moved into said clamping engagement;

first means for sensing that said support member has moved toward said stop member after said clamp has moved into said clamping engagement; and means, responsive to said first means for sensing, for driving said stop member and said support member between said partial and full insertion positions.

9. Apparatus according to claim 8, wherein said first means for sensing comprises a switch actuated by movement of said support member.

10. Apparatus according to claim 8, wherein said means for driving comprises:

a lead screw having a traveling nut operatively connected to said stop member; and a motor for rotating the lead screw.

11. Apparatus according to claim 8, wherein said means for preventing comprises a guide slot engaged by said clamp for preventing movement of said support member toward said full insertion position until said clamp has moved into said clamping engagement.

12. Apparatus according to claim 8, further comprising:

second means for sensing that said support member has moved to said full insertion position;

a door for closing an opening into the elongated chamber through which the cartridge may be inserted; and means, responsive to said second means for sensing, for closing said door when said support member reaches said full insertion position.

13. Apparatus according to claim 12, wherein said second means for sensing comprises a second switch actuated by movement of said support member.

* * * * *